United States Patent
Toper

(10) Patent No.: US 12,401,610 B1
(45) Date of Patent: Aug. 26, 2025

(54) INTELLIGENT DETECTION OF SPAM EMAIL PLACEMENT

(71) Applicant: Manycore Corporation, Covina, CA (US)

(72) Inventor: Nicolas David Toper, Palo Alto, CA (US)

(73) Assignee: Manycore Corporation, Corvina, CA (US)

( * ) Notice: Subject to any disclaimer, the term of this patent is extended or adjusted under 35 U.S.C. 154(b) by 0 days.

(21) Appl. No.: 18/368,469

(22) Filed: Sep. 14, 2023

Related U.S. Application Data

(60) Provisional application No. 63/406,677, filed on Sep. 14, 2022.

(51) Int. Cl.
  *H04L 51/212* (2022.01)
(52) U.S. Cl.
  CPC .................................. *H04L 51/212* (2022.05)
(58) Field of Classification Search
  CPC ....................................................... H04L 51/212
  See application file for complete search history.

(56) References Cited

U.S. PATENT DOCUMENTS

| | | | | |
|---|---|---|---|---|
| 9,847,973 B1* | 12/2017 | Jakobsson | ........... | H04L 63/0245 |
| 10,587,550 B1* | 3/2020 | Ciancio-Bunch | ..... | H04L 51/212 |
| 2007/0112920 A1* | 5/2007 | Hay | ........................ | H04L 51/00 |
| | | | | 709/206 |
| 2008/0131005 A1* | 6/2008 | Oliver | ................... | H04L 51/212 |
| | | | | 382/229 |
| 2008/0301281 A1* | 12/2008 | Wang | .................. | H04L 63/1416 |
| | | | | 709/224 |
| 2018/0219830 A1* | 8/2018 | O'Brien | .............. | H04L 61/5007 |
| 2020/0351242 A1* | 11/2020 | Huang | ..................... | G06N 7/01 |
| 2022/0294751 A1* | 9/2022 | Slobodyanuk | ........ | H04L 51/212 |

\* cited by examiner

*Primary Examiner* — Suraj M Joshi
(74) *Attorney, Agent, or Firm* — Cognition IP, P.C.; Edward Steakley

(57) ABSTRACT

Methods and systems are described for the intelligent detection of spam email placement within email service provider meta-domains. In one embodiment, the system receives and analyzes a referrer string for an email to determine when an email from an email campaign is opened in a specific meta-domain, and when an email from the email campaign is opened in a different meta-domain. The system can use the shapes (e.g., the peaks, or lack thereof) in email opens for some meta-domains deemed to be non-information rich, and see if those shapes match or have some overlap to the shapes of email opens in information rich meta-domains, in order to intelligently detect spam placement.

10 Claims, 5 Drawing Sheets

INTELLIGENT DETECTION OF SPAM EMAIL PLACEMENT

CROSS-REFERENCE TO RELATED APPLICATIONS

This application claims the benefit of U.S. Provisional Patent Application No. 63/406,677, filed on Sep. 14, 2022 and titled "INTELLIGENT DETECTION OF SPAM EMAIL PLACEMENT." which is hereby incorporated by reference in its entirety.

FIELD OF THE INVENTION

The present invention relates generally to computer science, and more particularly, to methods and apparatuses for intelligent detection of spam email placement within email service provider meta-domains.

BACKGROUND

Billions of email messages are sent per day around the world. Many of these email messages are undesired messages due to bad actors who mass produce phishing or scam emails. Because communication through the internet is important, organizations have deployed spam filters to combat mass undesired email messages. However, because of the effort to automatically re-move unwanted email messages, many legitimate emails, such as weekly newsletters, or targeted emails that are desirable, are often filtered as spam. Many common spam filters from email pro-viders are fuzzy spam filters and use machine learning or statistical techniques to detect spam. These include Gmail, Outlook, and others.

There have been efforts to understand and determine when an email sent to a recipient is being filtered by the recipient email address into a spam folder or the inbox. However, the current process of determining whether a message has been automatically filtered by a spam filter is both manually intensive, slow, and inaccurate, especially when modern spam filters are capable of adapting to user behavior, such as engagement with messages.

For example, after a certain number of successful attempts to send a marketing campaign email to targeted recipients, the email may begin having a lower successful response in the form of fewer recipients opening the email. Often, this is due to the spam filter adapting and responding over time to the email campaign. This may occur on a per-recipient basis. For example, an email provider may have gained an understanding of which emails a particular recipient would like to receive, and it may think that recipient wants to receive a lot of emails pertaining to a specific subject. That particular recipient may receive the campaign email in their inbox as not being considered spam, while other recipients do not receive the campaign email due to the spam filter labeling the email as spam for those recipients based on their preferences. Because of this per-recipient behavior of spam filters, it is often hard for a sender to know if a given email will be considered spam or not to a large number of intended recipients. The sender would need to have an understanding of, e.g., whether the email is considered spam or not for most of the target audience, or a specific subset of the target audience.

One prior embodiment relates to analyzing an email open rate per meta-domain (where each meta-domain may correspond to an email service provider such as, e.g., Gmail or Outlook), in order to look for discrepancies. For example, a particular email campaign may be found to have a 10% open rate on one meta-domain (e.g., Gmail), but a 50% open rate on another meta-domain (e.g., Outlook), which suggests a significant discrepancy in open rate between these different meta-domains. This method is useful to understand the nature of a deliverability problem, but it has severe drawbacks, such as, e.g., a need for enough traffic, problems with personally identifiable information ("PII") due to extensive tracking, and more.

Thus, there is a need for a way to better improve the intelligent detection of spam email placement within an email service provider, in a way to more accurately detect email deliverability problems, in order to improve the way organizations send messages.

BRIEF DESCRIPTION OF THE DRAWINGS

The present disclosure will become better understood from the detailed description and the drawings, wherein.

DETAILED DESCRIPTION

Figure 1:
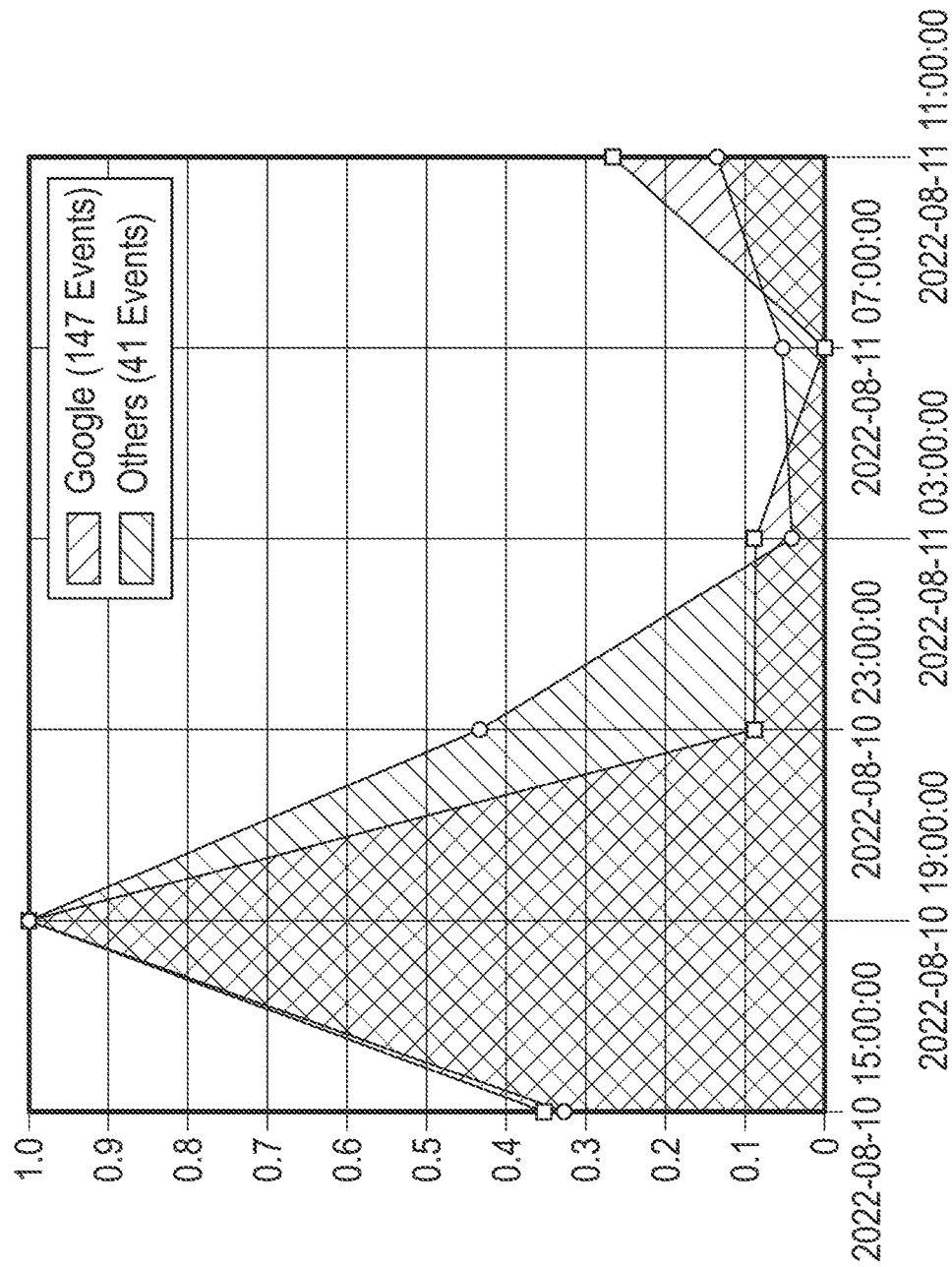
FIG. 1 is a diagram illustrating one example embodiment of intelligent detection of spam email placement.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

In one current embodiment, the system receives and analyzes a referrer string for an email to determine when an email from an email campaign is opened in a specific meta-domain, and when an email from the email campaign is opened in a different meta-domain. An email is opened in a specific meta-domain when the DNS for an email address resolves in a server corresponding to that meta-domain (e.g., a Google server for Gmail, or a Microsoft server for Outlook). The system may apply an assumption that senders will send the same type of emails to a specific meta-domain as to other meta-domains, i.e., a campaign will never target only email addresses from one email service provider. From this assumption, the system can provide a deduction that the nature and/or rate of the email being opened should be similar between Gmail and others if the email is not labeled as spam by any spam filters. An additional assumption may be applied that the proba-bility of an email being opened is approximately the same no matter what the email provider is, i.e., the number of email opens over time (e.g., per hour) should be similar if the emails are not labeled as spam.

For some meta-domains, email opens may be assumed by the system to always be a lot more numerous than others. This represents an understanding that there is more information in an open feed from those meta-domains compared to others. The system can accordingly use the shapes (e.g., the peaks, or lack thereof) in email opens for some meta-domains deemed to be non-information rich, and see if those shapes match or have some overlap to the shapes of email opens in information rich meta-domains, in order to intelligently detect spam placement. It may be noted that this process will not succeed at detecting spam placement when operating the other way, due to the "lower information density" (i.e., a much lower number of opens).

The above embodiments and methods provide the ability to continuously monitor for detection of spam email placement, using a lightweight solution that improves upon previous methods by providing a significantly less complex process to maintain and/or deploy.

Further areas of applicability of the present disclosure will become apparent from the de-tailed description, the claims and the drawings. The detailed description and specific examples are intended for illustration only and are not intended to limit the scope of the disclosure.

Within one exemplary embodiment, the process for the system performing the analysis and matching of shapes or peaks for email opens from different meta-domains, as described above, may include one or a combination of the following steps, where "others" represents up to A meta-domains with lower information density, "dense" represents a meta-domain with higher information density, B represents a statistical threshold number of events, C represents hours of difference within a given interval of time:

1. If sum others>sum dense: unknown
2. If sum others<A: unknown
3. For others:
   a. Filter events that have less than ceiling (average number of events per hour if>B events; if<B events, results 2*) NB avg=total of events/24
   b. Extract peaks values (note: if square wave. 2 peak values will be present)
   c. If there is one peak, return unknown, not enough data
   d. For each peak.
      i. Map it to dense peaks (with +/−C hours of difference)
      ii. Then check size (i.e. normalize) ratio to make sure they are on the same length.
         1. To normalize, divide every peak by the sum of events 2. If dense %>% other, it's not in spam
      3. else
      4. If % peak min/% peak max <50%, then email is in spam for these hours In some embodiments, deep learning may be used to perform one or more of these steps. In some embodiments, the deep learning may be performed by a simple neural network or proto-neural network. Such a neural network may function to amplify and reduce the signals in some of the steps based on weights applied to parameters, such as a function where a wave is present. In some embodiments, some or all of these steps may be part of a combination of steps or methods which are combined in a unique way for a given sender of an email campaign.

In some embodiments, the system employs k-means algorithms or methods to perform one or more of the above steps. In some embodiments, the system enables a user of the system to track and perform the steps on a per-template basis for campaign email templates. In some embodiments, such templates can be parameterized and/or customized in a number of ways.

In some embodiments, the system receives and analyzes referrer strings in order to perform some or all of the above steps, in order to ascertain whether email opens are from one meta-domain or another. In some embodiments, the system compares the open range (i.e., range in number of opens), and if there is too much difference between one meta-domain and another, then the system determines that the email has been labeled as spam. If the comparison is roughly half and half, then the system determines that the email has not been labeled as spam. In some embodiments, the system analyzes the email being sent to provide further information which can be compared between meta-domains.

In some embodiments, additionally or alternatively to the shapes (or peaks) comparison above, the system analyzes the email open rates for meta-domains to see if the open rate for any of the meta-domains drop. If there is a drop in open rate for a meta-domain, then the system can predict to some degree of confidence that the email has been labeled as spam for a subset of the intended recipients, since the drop in open rate is contrary to historical data which the system has access to.

In some embodiments, additionally or alternatively, the system employs seed testing, wherein the system sends emails to ascertain whether they are labeled as spam or not in given meta-domains.

In some embodiments, additionally or alternatively, the system compares the total of "others" email opens (i.e., from less information rich meta-domains) to the total of "dense" email opens (i.e., from more information rich meta-domains). If the ratio is uneven, e.g., not roughly the same, then the system can predict to some degree of confidence that the emails have been labeled as spam for the meta-domain with less opens.

In some embodiments, a statistical threshold is used for some or all of the steps. In some embodiments, a slight time interval difference is taken into account. Because of such a time interval difference, the system may account for the difference experimentally, i.e., the system may determine that the difference is plus or minus 2 hours. The system may compare the maximum peak around the same time between meta-domains, for example. In some embodiments, one or more data normalization steps are performed by the system, while in some embodiments, the system determines one or more percentages rather than normalizing data.

FIG. 1 is a diagram illustrating an example embodiment of intelligent detection of spam email placement. Specifically, the diagram illustrates one example embodiment of a comparison of a shape (i.e. peaks or lack thereof) from an information rich meta-domain to the shape of a less-information rich meta-domain. In this particular example, the system determines that the peaks matched earlier in the day, thus predicting that emails were not labeled as spam from either meta-domain during that time, then spam placement occurred later in the day, due to the lack of peaks and significant drop in email open rate for both meta-domains.

Figure 2:
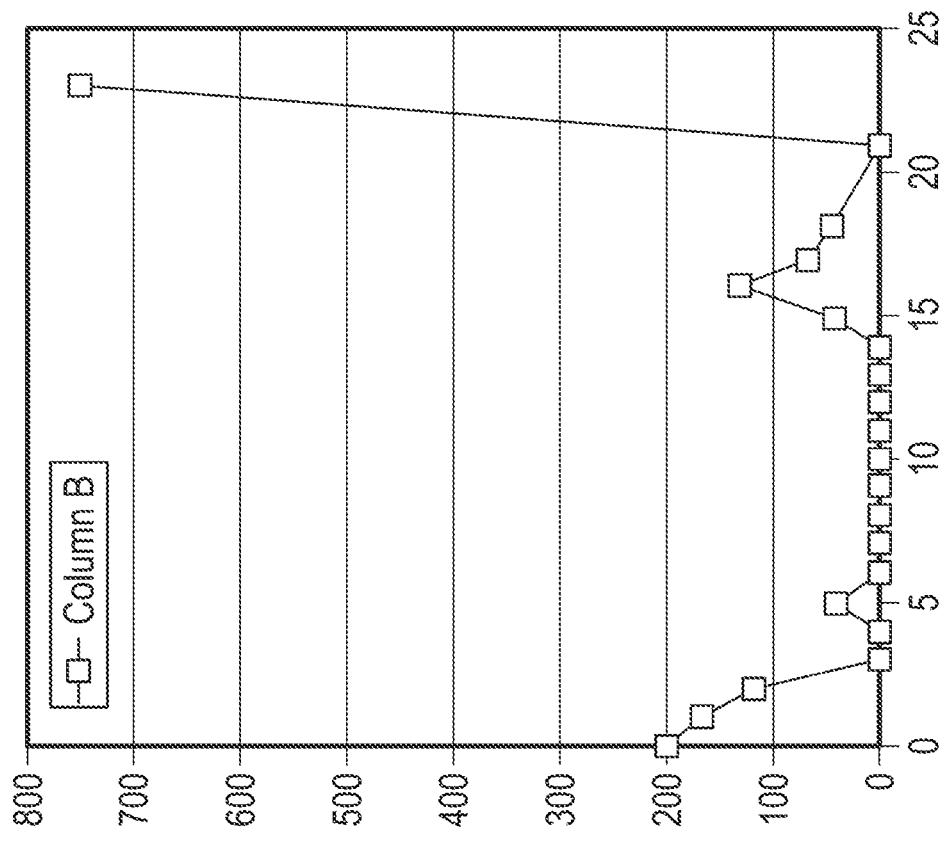
FIG. 2 is a diagram illustrating another example embodiment of intelligent detection of spam email placement.
Figure 2:
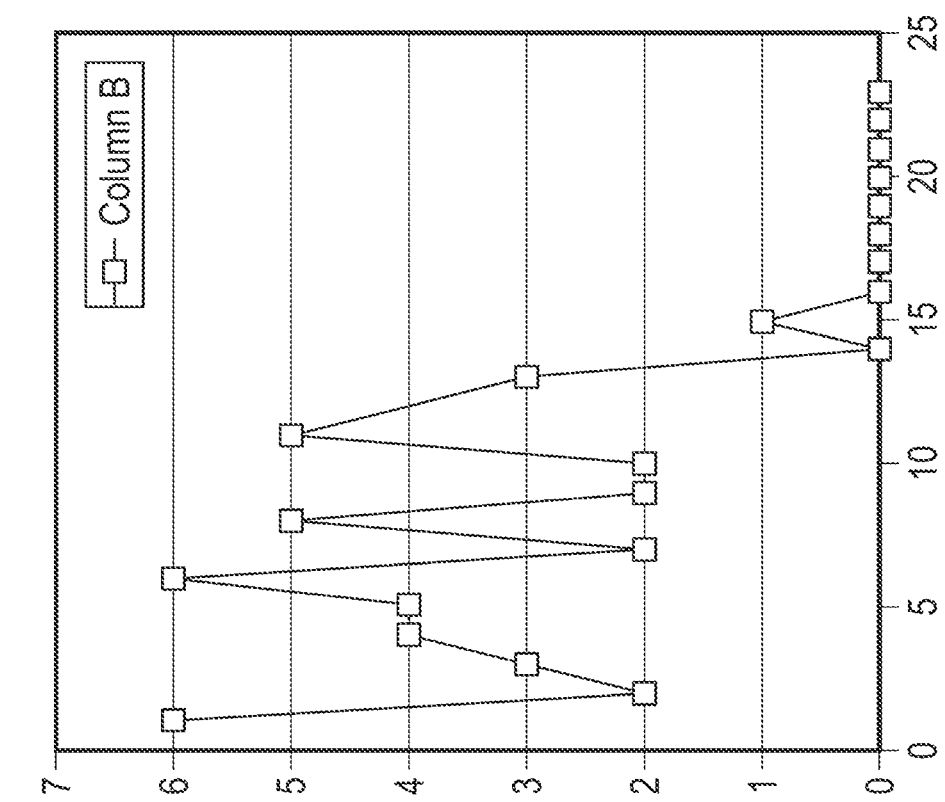

FIG. 2 is a diagram illustrating another example embodiment of intelligent detection of spam email placement. Specifically, the diagram illustrates one example embodiment of a comparison of a shape (i.e. peaks or lack thereof) from an information rich meta-domain to the shape of a less-information rich meta-domain. In this particular example, the system determines that the peaks of the first meta-domain are not present in the second meta-domain at the same time of day, and the peak of the second meta-domain is not present in the first meta-domain at the same time of day. Thus, the system determines that there has been spam placement in the meta-domains.

Figure 3:
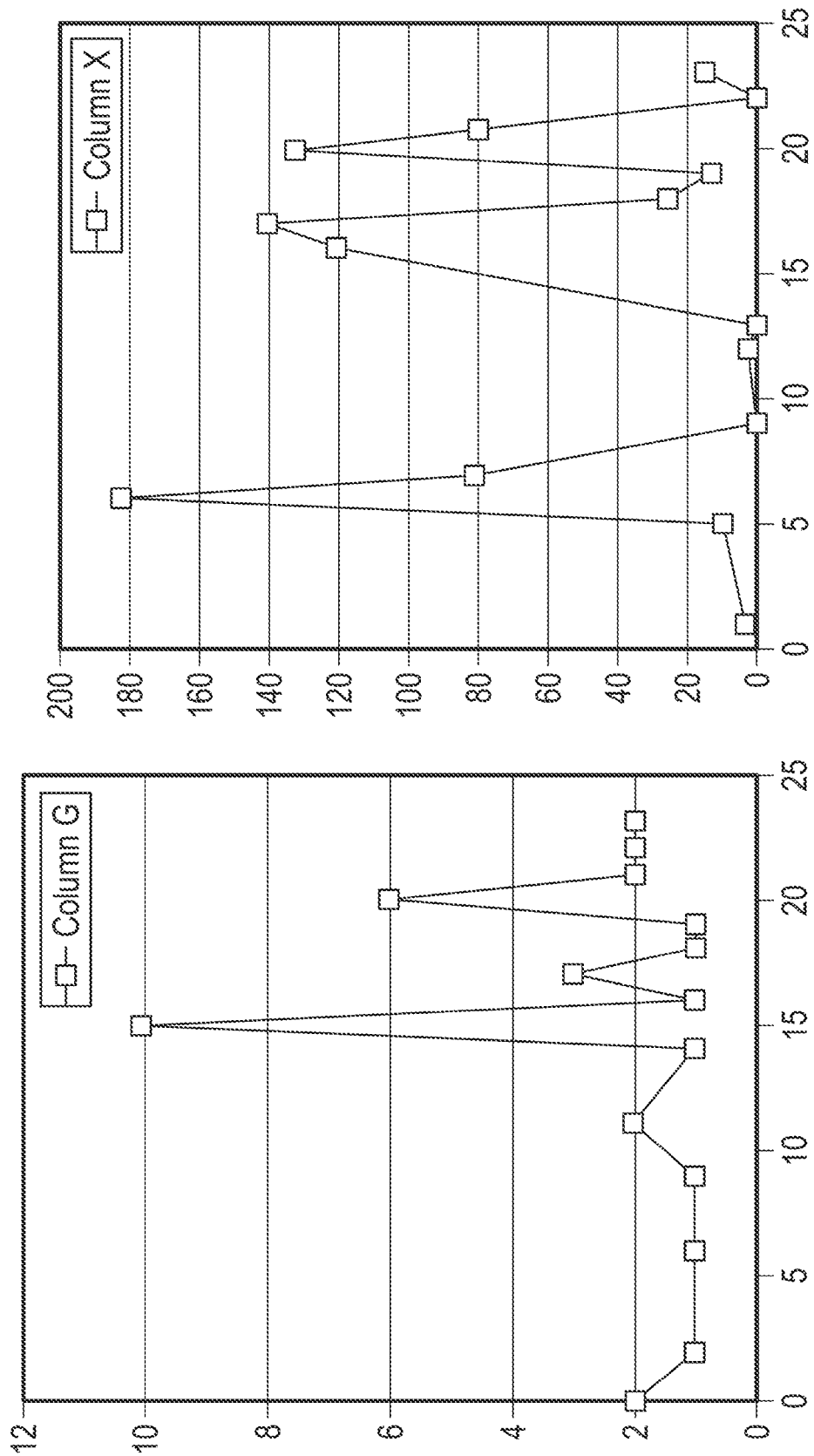
FIG. 3 is a diagram illustrating another example embodiment of intelligent detection of spam email placement.

FIG. 3 is a diagram illustrating another example embodiment of intelligent detection of spam email placement. Specifically, the diagram illustrates one example embodiment of a comparison of a shape (i.e. peaks or lack thereof) from an information rich meta-domain to the shape of a less-information rich meta-domain. In this example, the ratio of the peaks are not the same, and some are not present. Thus, the system determines that there has been spam placement detected.

Figure 4:
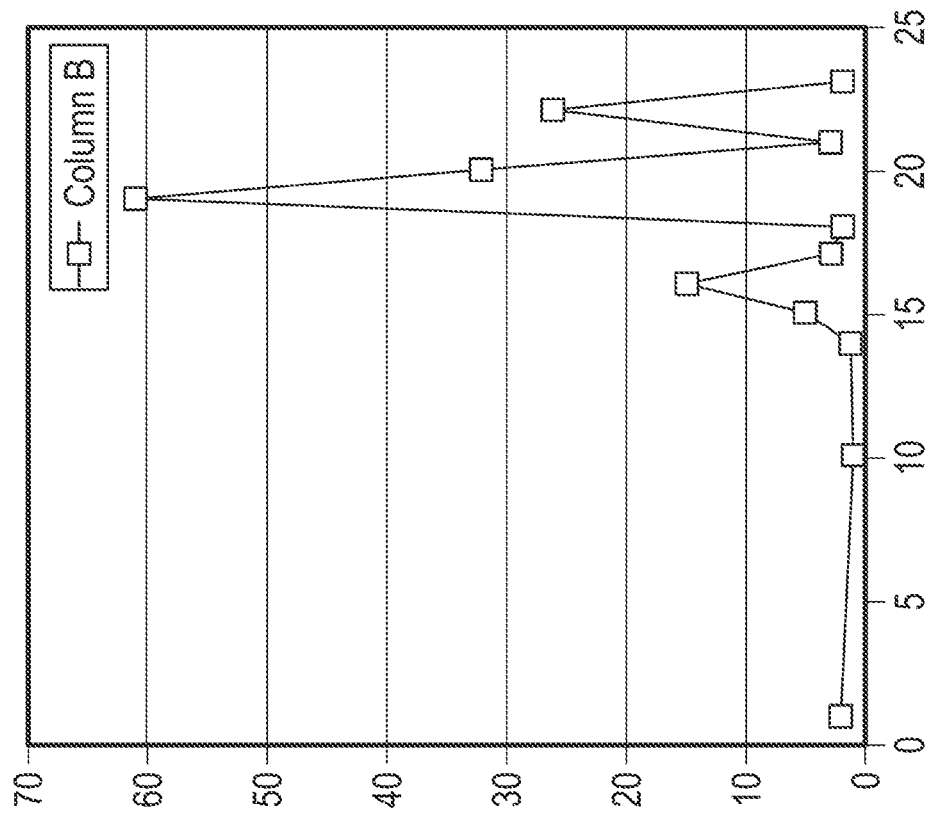
FIG. 4 is a diagram illustrating another example embodiment of intelligent detection of spam email placement.
Figure 4:
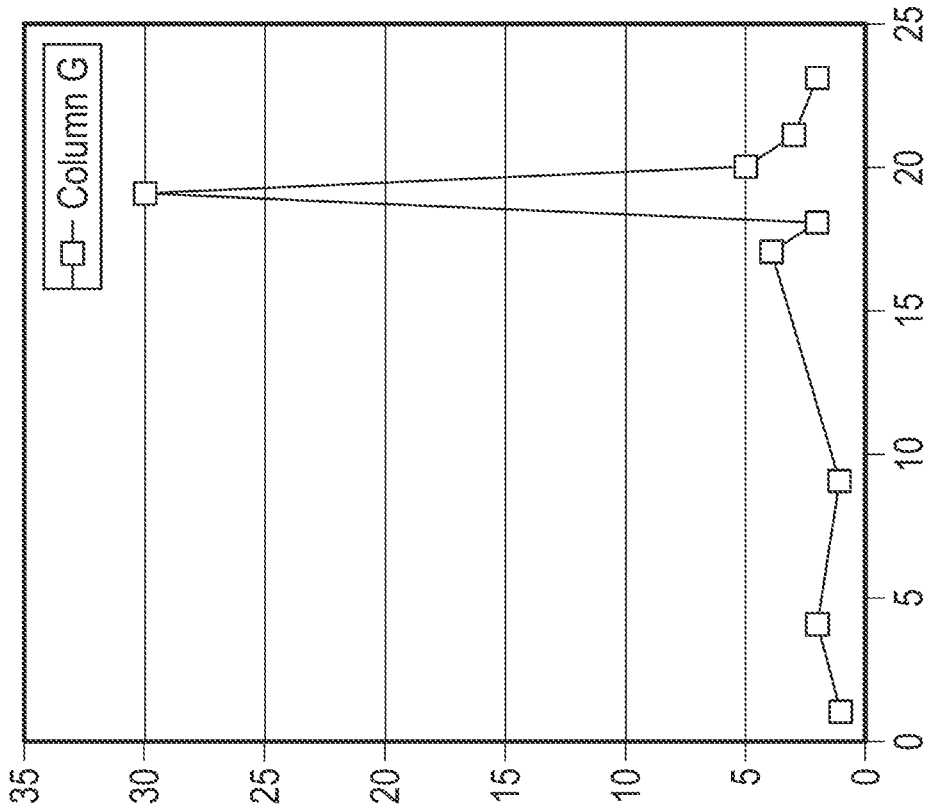

FIG. 4 is a diagram illustrating another example embodiment of intelligent detection of spam email placement. Specifically, the diagram illustrates one example embodiment of a comparison of a shape (i.e. peaks or lack thereof) from a less-information rich meta-domain to the shape of a more-information rich meta-domain. In this particular example, the system determines that the peak of the first meta-domain is also present in the second meta-domain which has higher information density. Thus, the system determines that no spam placement has been detected for these meta-domains.

Figure 5:
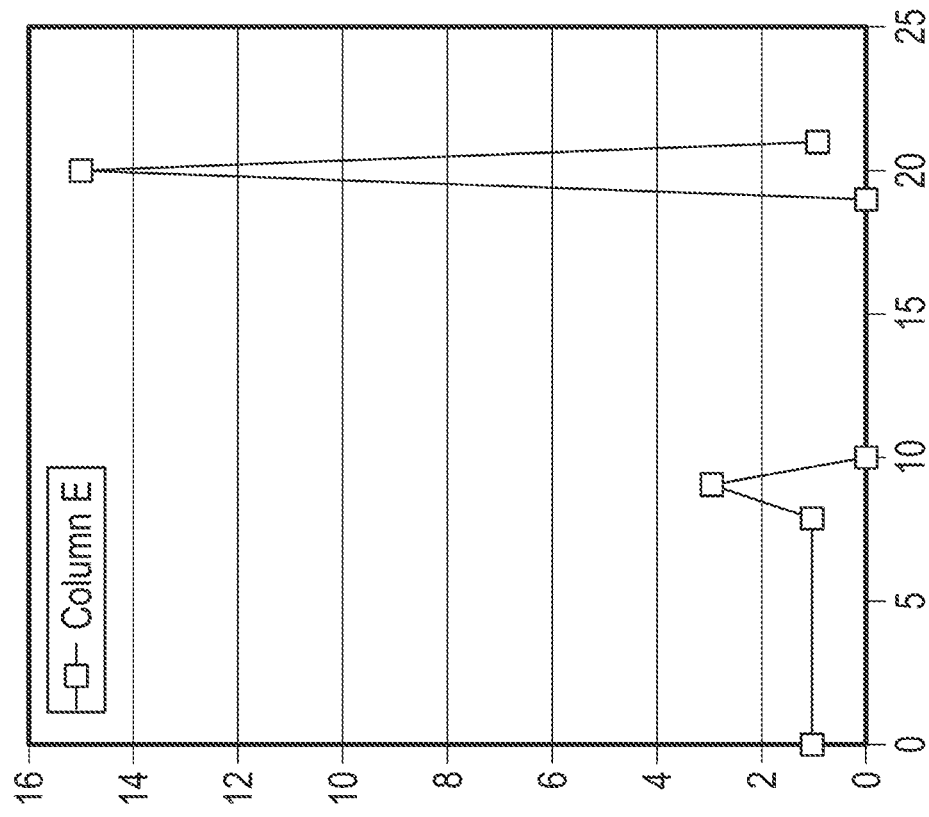
FIG. 5 is a diagram illustrating another example embodiment of intelligent detection of spam email placement.
Figure 5:
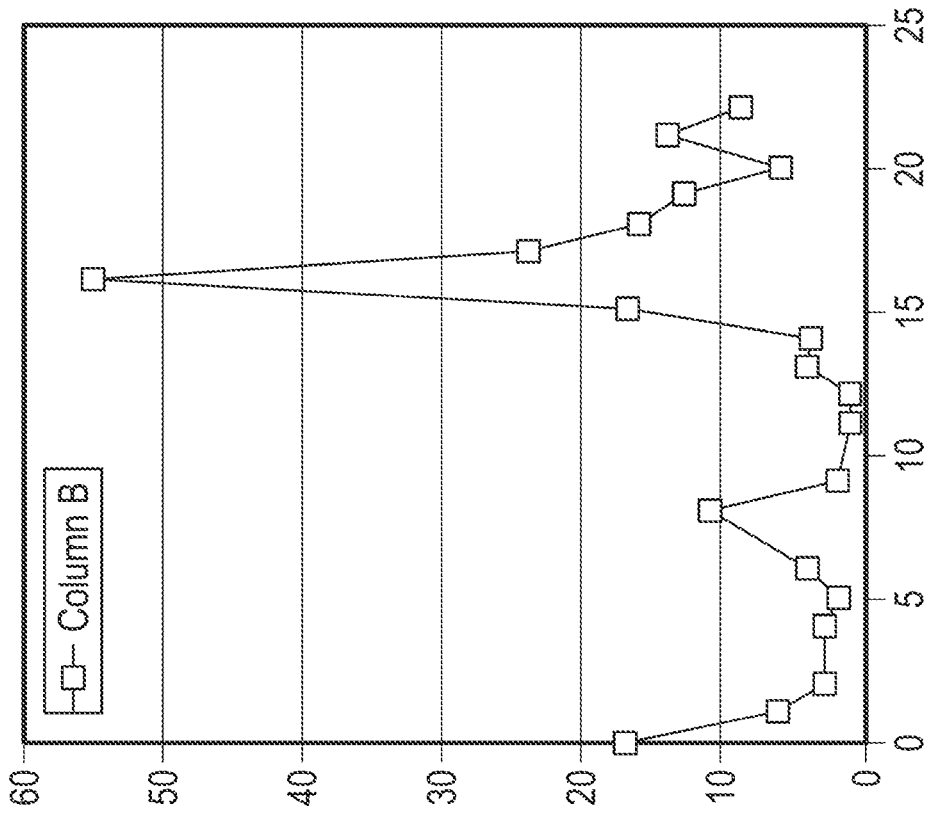

FIG. 5 is a diagram illustrating another example embodiment of intelligent detection of spam email placement. Specifically, the diagram illustrates one example embodiment of a comparison of a shape (i.e. peaks or lack thereof) from a more-information rich meta-domain to the shape of a less-information rich meta-domain. In this particular example, the system determines that the peak of the first meta-domain is also present in the second meta-domain which has lower information density. Thus, the system determines that no spam placement has been detected for these meta-domains.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

The present disclosure also relates to an apparatus for performing the operations herein.

This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, op-tical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method for intelligent detection of spam email placement within email service provider meta-domains, comprising the steps of:
   distributing, by a computer system, multiple emails for an email campaign, wherein the multiple emails of the email campaign are sent to multiple servers associated with different email meta-domains;
   receiving data by the computer system from the multiple servers, the data being associated with a plurality of emails of the multiple distributed emails, wherein the data indicates that a distributed email was opened with respect to a particular meta-domain;
   for the multiple emails of the email campaign, determining, by the computer system, when an email from the email campaign is opened in a specific meta-domain wherein a domain name server for an email address resolves to a server corresponding to a meta-domain of an email;

determining, by the computer system, peak values for emails being opened for the respective multiple email meta-domains; and based on a peak similarity comparison of the emails being opened, determining whether the distributed emails were or were not filtered by a spam filter on a respective meta-domain.

2. The method of claim 1, further comprising:

determining, by the computer system, a peak similarity for a rate of emails being opened for the multiple meta-domains;

determining, by the computer system, that a number of the emails of the email campaign are not labeled as spam where a number of emails opened over time have a similar open rate for a first email meta-domain as compared to a second email meta-domain; and determining, by the computer system, that a number of emails are labeled as spam based on a difference of a number of email opens as to the first email meta-domain and compared to the second meta-domain of the different email meta-domains.

3. The method of claim 1, further comprising:

comparing a range of the number of email opens;

determining that email has been labeled as spam where there is a difference threshold between the first email meta-domain and the second email meta-domain; and determines that the email has not been labeled as spam where a difference is about half and half as to the number of email opens as to the first email meta-domain and the second email meta-domain.

4. The method of claim 1, further comprising:

determining that a shape of a peak of a first meta-domain is also present in a second meta-domain; and determining that no email spam placement has been detected for the first and second meta-domains.

5. The method of claim 1, further comprising:

receiving and analyzing the data comprising referrer strings; and determining whether email opens are from one meta-domain or another meta-domain.

6. The method of claim 1, further comprising:

analyzing email open rates for each of the meta-domains to determine if an open rate for any of the meta-domains drop over a period of time.

7. The method of claim 1, further comprising:

performing seed testing comprising sending test emails to determine whether test emails are labeled as spam or not in given meta-domains.

8. The method of claim 1, further comprising: comparing a total of other email opens to the total of a dense email opens.

9. The method of claim 8, wherein the other email opens are from more information rich meta-domains, and dense emails opens are from less information rich meta-domains.

10. The method of claim 1, further comprising:

evaluating an interval difference between two or more meta-domains.

* * * * *